United States Patent [19]

Bienvenu

[11] 4,145,734
[45] Mar. 20, 1979

[54] METHOD AND APPARATUS FOR IMPLEMENTING THE TEST OF COMPUTER FUNCTIONAL UNITS

[75] Inventor: Jacques M. J. Bienvenu, Paris, France

[73] Assignee: Compagnie Honeywell Bull (Societe Anonyme), Paris, France

[21] Appl. No.: 760,326

[22] Filed: Jan. 18, 1977

Related U.S. Application Data

[63] Continuation of Ser. No. 570,404, Apr. 22, 1975, abandoned.

[51] Int. Cl.² ............................................. G06F 11/00
[52] U.S. Cl. .................................................. 364/200
[58] Field of Search ................. 235/153 AC, 153 AK, 235/304.1; 340/172.5; 364/200 MS File

[56] References Cited

U.S. PATENT DOCUMENTS

| 3,519,808 | 7/1970 | Lawder | 340/172.5 |
| 3,953,717 | 4/1976 | Rottier et al. | 235/153 AK |
| 3,988,579 | 10/1976 | Bottar et al. | 235/153 AK |

OTHER PUBLICATIONS

IBM 7080 Data Processing Ref. Manual–A22-6560-1, 1961; pp. 4, 75, 76, and 82-84–avail. Poughkeepsie, N.Y.
IBM General Information Manual–F22-6517, 1960; Frontispieces and pp. 5-7.

*Primary Examiner*—Harvey E. Springborn
*Attorney, Agent, or Firm*—Cameron, Kerkam, Sutton, Stowell & Stowell

[57] ABSTRACT

The disclosure describes improved apparatus and method for implementing the test of various computer functional units interconnected by a common bus. At the beginning of the method, each functional unit is subjected to an enforced condition which disconnects it from the bus. Then, one of the units is subjected to an enforced condition which connects it to the bus and is tested under microprogram control. After the one unit has been tested, another unit is connected to the bus and is tested. In this manner the functional units after first being disconnected from the common bus are reconnected and tested one at a time and those units which have no error detected therein are maintained connected.

11 Claims, 2 Drawing Figures

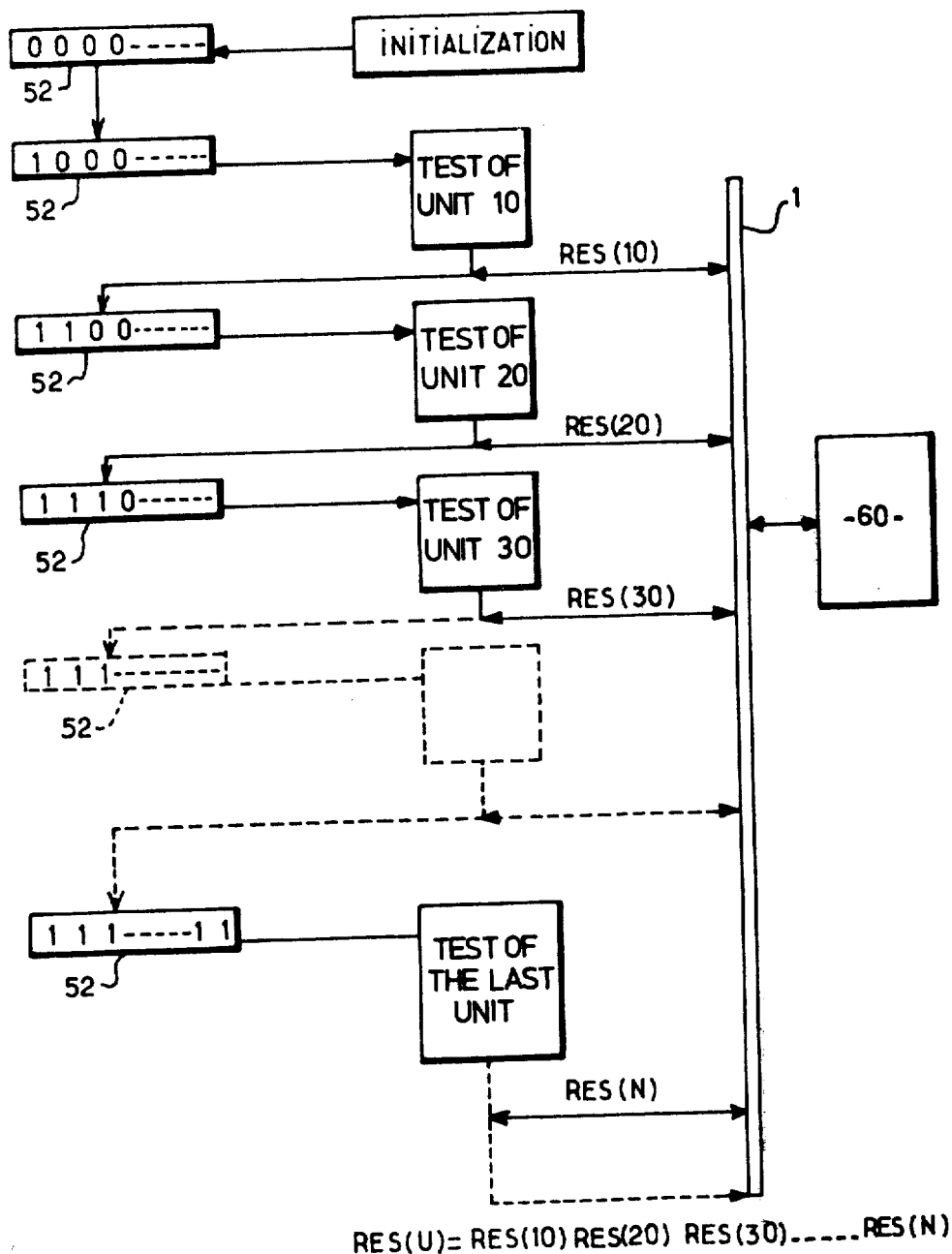

METHOD AND APPARATUS FOR IMPLEMENTING THE TEST OF COMPUTER FUNCTIONAL UNITS

This is a continuation of application Ser. No. 570,404 filed Apr. 22, 1975, now abandoned.

BACKGROUND AND SUMMARY OF THE INVENTION

This invention relates to test techniques and more specifically relates to techniques for implementing the test of functional units of a digital computer.

The invention has as an object a method and an apparatus for implementing the test of various functional units in a data processing unit so as to make it possible to detect and locate a faulty member or component in one of the functional units of a data processing unit.

It is known that errors may occur while a program is running in the processing unit, certain of which are due to miscoding in programming and others of which originate from random or systematic faults in one of the members making up the system.

Various testing methods are known at the present time which enable the constituent members of the system which are responsible for the aforementioned systematic faults to be located, these methods consisting in:

either recognizing an error by comparing the actual result obtained after an operation with a predetermined result (which enables a fault to be shown to exist but does not enable its cause to be established);

or carrying out an operation a number of times so as to rule out the possibility of a random fault, or carrying out this operation in a second, identical group of circuits provided for this purpose;

or using a zero-reset circuit for example, which once tested, will be used in testing the other logic circuits. A sequence of binary configurations is then applied to the inputs of the system to be tested and the output results obtained are recorded so that they may then be compared with values from a table which contains binary configurations each of which corresponds to a particular type of fault, thus allowing the fault to be located and its cause to be found.

However, all these known method make it necessary to have available a group of additional circuits and the number of these may be relatively large, which makes maintenance units very much more complicated.

In order to remove these drawbacks, the invention has as an object a method for implementing the test of the functional units of a data-processing unit which allows faulty functional units to be detected and located and in which the testing of these units, which are normally connected together by a main system of bi-directional links or main bus, is implemented by applying imposed conditions and examining the results obtained characterized in that it comprises the steps of disconnecting each functional unit from the main bus in the functional unit to main bus direction, connecting one of the functional units to the main bus, testing as by applying test conditions to this functional unit by means of a microprogram contained in the control store of the unit, comparing the result of carrying out this microprogram in the functional unit with a series of reference values which correspond to, respectively, the normal operation of the unit and a series of predetermined faults on the part of its components by means of a microprogram in the processing unit and then, connecting another functional unit to the main bus and testing it as before.

In this manner, each of the functional units are reconnected to the main bus, one by one, upon a determination of the absence of faulty operation of the unit.

The method according to the invention thus allows a faulty member or component in a functional unit to be located by means of conventional test type microprograms which are recorded beforehand in the control store and which are carried out automatically in the functional units to be tested.

The result obtained by carrying out a microprogram in a unit cannot be affected by the faulty state of a functional unit which has yet to be tested, by virtue of the fact that the functional units, having first been disconnected from the main bus, are reconnected one-by-one for the test. The circuits required to put the method according to the invention into effect thus solely comprise logic circuits for connecting and disconnecting the functional units to and from the main bus and their number is thus reduced to a minimum.

The invention also has as an object an apparatus and method for implementing the test of the functional units of a data-processing unit with a view to detecting and locating functional units which are faulty, the said functional units, one of which contains the control store, being connected together and to a maintenance unit by a system of bi-directional links or main bus, which method is characterized by the steps of connecting and disconnecting the functional units to and from the main bus which make each bi-directional link selectively conductive or non-conductive in the direction from the functional unit to the main bus, carrying out predetermined operations in a functional unit which is connected to the main bus, and comparing the results of the aforementioned operations with reference values so as to detect and locate a faulty component in the said functional unit which is connected to the main bus.

DESCRIPTION OF THE DRAWINGS

The preferred embodiment of the invention will now be further described, by way of example, with reference to the accompanying drawings, in which:

FIG. 2 shows, in block form, the progress of the test method according to the invention.

DESCRIPTION OF THE PREFERRED EMBODIMENT

Figure 1:
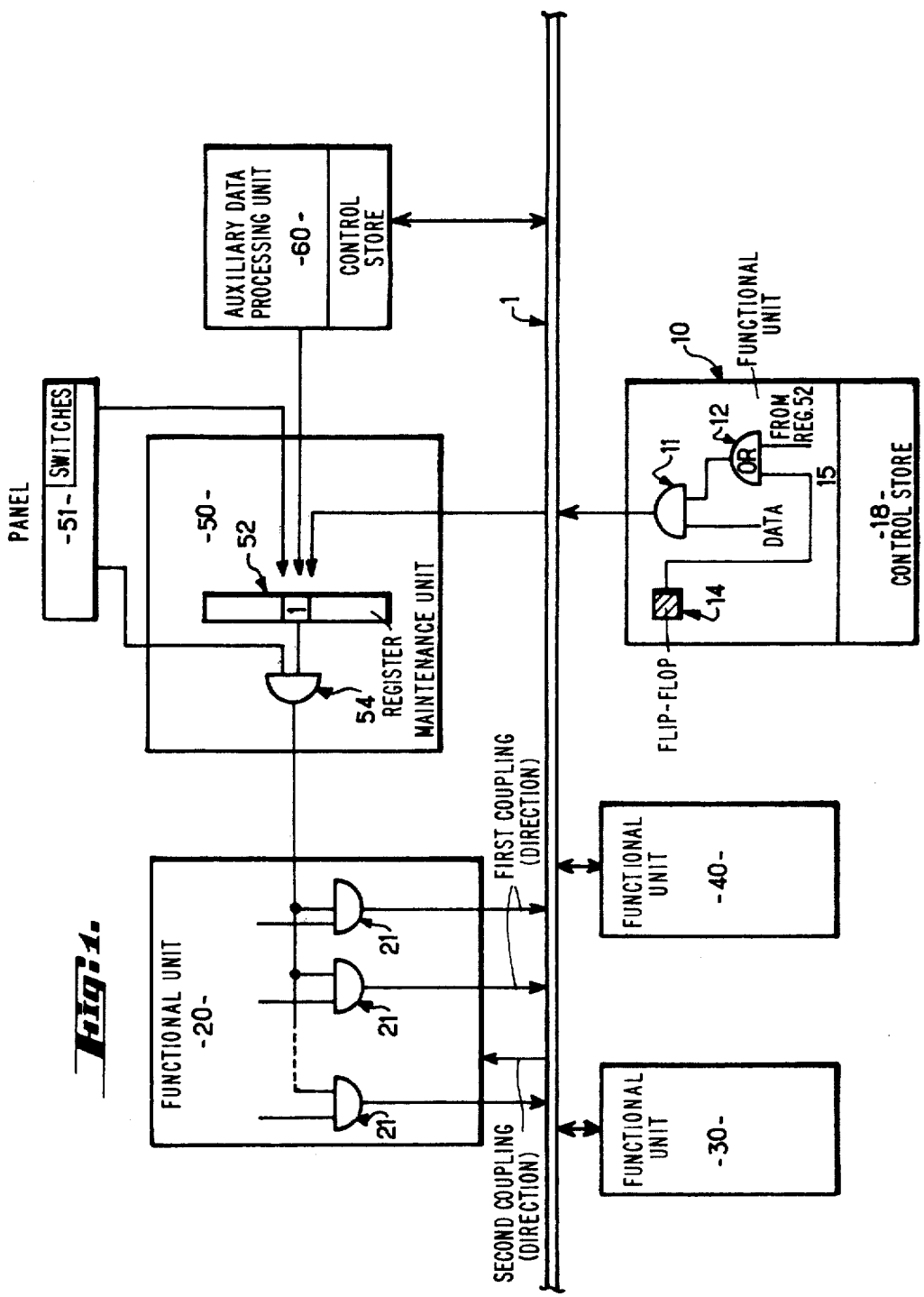
FIG. 1 is a schematic view of the functional units of a data-processing unit, and of the means employed in accordance with the invention to connect and disconnect the functional units to and from the main bus.

FIG. 1 is a schematic view of part of a data-processing unit which has been divided up into various functional units which comprise, inter alia:

a maintenance unit 50 associated with a maintenance panel 51 which contains display units and apparatus for carrying out various operations of the usual type;

a first functional unit 10 which contains the control store 18 of the processor;

functional units 20, 30, 40, etc., of which only the first three are shown here;

means for linking between the units, including a system of bi-directional links 1 termed the main bus;

a data-processing and recording unit 60 which is connected to the main bus. Exemplary data processing units having functional units of the type described include the Honeywell Series 60, Level 64, Model 20 and the IBM 360, Model 25. The same type of processing units can be used for unit 60. Such units are described in the following publications:

"Automatic Data Processing-System/360 Edition", Frederick P. Brooks, Jr. and Kenneth E. Iverson edited by John Wiley & Sons, 1969;

"Microprogramming: Principles and Practices", Samir S. Husson edited by Prentice-Hall, 1970; and To illustrate how a data-processing unit is made up of a set of functional units, see FIG. 6-1 page 168 of the book "Introduction to Digital Computer Design", Herbert S. Sobel, Edited by Addison-Wesley, 1970.

When one of the functional units 10, 20, 30, 40, etc., is faulty, all of them being connected to the main bus, it is impossible to determine which unit originated the detected error and consequently to locate this faulty unit.

The method according to the invention allows the functional units to be tested and to locate that one of these units which is operating incorrectly due to some fault in one of its components.

In practice it is assumed that a detected error is due to the abnormal operation of only one functional unit and that a diagnosis is made by only locating this unit and determining the faulty component in it in order to recover the fault.

In the following description, a unit will be said to be connected to the main bus when the connection in the direction from the functional unit to the main bus has been made conductive, and will be said to be disconnected from the main bus when the connection in this direction has been made non-conductive. This means that the connection in the direction from the main bus to the functional unit remains continuously conductive.

The connection and disconnection of a functional unit to and from the main bus are, in accordance with the invention, the responsibility of a register 52 in the maintenance unit, in which register each location corresponds to a functional unit to be tested. AND gates 54 (only one of which is shown in FIG. 1) are fed on the one hand by the binary bits 0 or 1 contained in the register locations and on the other hand by a binary bit which is applied from the maintenance panel. The outputs of AND gates 54 are connected to inputs of AND gates 21 in the functional units, these AND gates or transmitters 21 connecting or disconnecting the functional units to or from the main bus.

It will be assumed that the binary bit transmitted from the maintenance panel 51 is a "1"; this being so, the functional unit will be connected to the main bus 1 when the binary bit in the corresponding location in the register is "1" and it will be disconnected if this binary bit is "0".

The binary bits may be written into register 52 in three different ways:

either by a manual operation, directly from the maintenance panel 51, by means of appropriate switches;

or by a remote order originating from processing unit 60;

or from functional unit 10 via the main bus 1.

This last possibility necessarily implies that the unit 10, which contains a control store 18, is already connected to the main bus.

To this end the connection of this particular unit 10 may be effected in a number of different ways:

either in one of the three ways mentioned (directly from the maintenance panel 51, by a remote order from unit 60, or via the main bus 1 by means of a microprogram recorded in the control store);

or by a micro-order from unit 10 without using the main bus.

In effect, functional unit 10 includes a flip-flop 14 which may be set to the "1" state and the output of which is connected to an input 15 of an OR gate 12, to the other input of which is applied the binary bit from the appropriate location in register 52. The output of OR gate 12 is connected to the input of an AND gate 11, the other input of which receives data.

A connection may thus be formed between the unit 10 and the main bus either directly by means of flip-flop 14 or via the microprogram in the processing unit 60, remembering in this latter case that the link between the main bus 1 and unit 10 remains conductive as mentioned above.

When a connection is formed between a functional unit and the main bus, it becomes possible to test this unit by means of a microprogram which has previously been recorded in the control store. Unit 10 will thus be the first one connected to the main bus 1 for testing, given that it contains its control store 18, and units 20, 30, 40, etc., will then be connected one-by-one in the way which is to be described in detail with reference to FIG. 2.

In FIG. 2, the sequence of the operations according to the invention for testing the functional units is shown in schematic form.

When a systematic fault is detected, its detection and the location of a faulty component in the functional unit concerned is effected in the following way:

At switch-on, register 52 is set to the "0" state, i.e. a binary "0" is written at each location of the register which corresponds to a functional unit to be tested.

A binary "1" is simultaneously applied, from maintenance panel 51, to the appropriate inputs of AND gates 54, so that, as a result of a binary "1" being written into a location of register 52, the corresponding functional unit will be connected to the main bus.

The first unit which is connected in this way is the unit 10 which contains the control store 18. A corresponding test microprogram contained in the control store of the processing unit is then carried out in unit 10 and the result RES (10) of this microprogram is transmitted along the main bus 1 to the data unit 60, where it is recorded and compared with predetermined values from a data table, one of which values is equivalent to correct operation by unit 10 and the others of which each correspond to a fault in a specific component in unit 10.

If it is unit 10 which is the cause of the systematic error which has been detected, the result RES (10) will normally allow the identity of the faulty component to be established, and this component can then be changed.

If unit 10 is operating correctly, another functional unit, such as 20, is connected to the main bus by writing a binary "1" in the appropriate location in register 52; then the corresponding test microprogram, which is likewise recorded in the control store, is carried out in unit 20. The result of this microprogram, i.e. RES (20), is transmitted to unit 60, where it is recorded and compared to values from a data table of the aforementioned type. If unit 20 is operating properly, the next unit, 30 for example, is connected to the main bus and tested; if not, the cause of the fault will have been detected and the faulty component in unit 20 is changed.

It will be noted that once tested and found satisfactory, a functional unit remains connected to the main bus while the next unit is being tested. When all the functional units have been tested and found in a proper state, all the locations in register 52 will be in the binary "1" state.

It can also be seen that the functional units 10, 20, 30, 40, etc., may be tested one-by-one as described, obtaining a final result RES (U) which will be formed by a combination of all the intermediate results RES (10), RES (20), etc., which have been recorded. Thus RES (U) will be equal to RES (10) RES (20) RES (30), etc., and its value will then be compared to the values from a data table in unit 60. The first wrong intermediate result will allow the faulty unit to be identified, and the value of this intermediate result will be used to establish the identity of the faulty component.

Where the value of an intermediate result does not appear in the data table recorded in unit 60, it is open to the operator to test the faulty functional unit directly from the maintenance panel 51. Inter alia he may connect this unit to the main bus and disconnect the others, and may then carry out series of special tests on this unit using the controls on the maintenance panel.

The test programs and the design and comparison techniques are stored in the control store of unit 60 and are carried out by unit 60 are well known in the art and may be implemented by any convenient means. One example of a microprogram capable of testing the functional units of a computer is shown in U.S. Pat. No. 3,838,260. Other such testing techniques are disclosed in U.S. Pat. No. 3,497,685 and U.S. Pat. No. 3,815,103.

Suitable comparison and analysis techniques for locating errors in computer functional units are described in U.S. Pat. No. 3,343,141; U.S. Pat. No. 3,603,936; and, U.S. Pat. No. 3,405,258. The details of the test microprograms and the comparison techniques employed in unit 60 are not part of the present invention.

The method according to the invention thus makes it possible to test the functional units of a data-processing unit in a rapid and reliable way by carrying out microprograms and examining the results obtained, using for this purpose logic circuits the number of which is reduced to a minimum and which, when they already form part of the maintenance unit and the functional units, are controlled in accordance with the invention in the particular manner which has been described.

The invention is, of course, in no way limited to the methods of implementation described and illustrated, which are given only by way of example. On the contrary the invention covers all means which represent technical equivalents of those described and illustrated, as well as combinations thereof employed in the spirit of the invention and within the scope of the following claims.

What is claimed is:

1. A method for implementing the test of a plurality of functional units of a data processing system in the course of its normal operation, the functional units being normally interconnected by a bidirectional bus, the data processing system including means for applying imposed test conditions to each of the functional units, whereby each functional unit responds to the imposed test conditions to provide test results, and means for comparing the test results with a series of reference values which correspond respectively within the normal operation of the functional unit to determine when a functional unit is faulty, the bidirectional bus being connectable to establish a connection in a first direction from each of the functional units to the bidirectional bus and to establish a connection in a second direction from the bidirectional bus to each of the functional units, said method comprising the steps of:

(a) establishing and maintaining the connection of the bidirectional bus to each of said functional units and disconnecting the connection in the first direction of each of the functional units from the bidirectional bus;

(b) applying from the applying means at least one of the imposed test conditions to the bidirectional bus;

(c) reconnecting in the first direction a first functional unit whereby the test result developed by the first functional unit is applied via the bidirectional bus to the means for comparing to determine if the first functional unit is faulty; and (d) reconnecting each of the other functional units in a predetermined order in the first direction so that the test results are applied one by one via the bidirectional bus to the means for comparing, whereby each of the functional units is tested in the predetermined order to determine whether it is faulty.

2. A method according to claim 1, wherein a maintenance unit is connected with the functional units in the data-processing system, the maintenance unit including a register having a plurality of locations, said method further comprising the steps of:

assigning a location in the register to each functional unit, each location receiving and storing a bit comprised of one of two values; and said step of reconnecting said first and other functional units in the first direction to the bidirectional bus is effected in accordance with the bit stored in the corresponding location of the register for that functional unit.

3. A method according to claim 2, wherein the step of storing one of two values of the bit into each of the corresponding locations of the register includes the actuation of a corresponding switch of the maintenance unit.

4. A method according to claim 2, wherein the step of storing one of two values of the bit into each of the corresponding locations of the register including generating a remote order from an auxiliary data-processing unit and applying the remote order via a maintenance channel to the register.

5. A method according to claim 2, wherein the first functional unit includes a control store for storing microprograms, said step of storing one of two values of the bit into each of the corresponding locations of the register includes the reading of a microprogram in the control store to provide the selected one value and the reconnecting of the first functional unit in the first direction to the bidirectional bus, whereby the value is applied from said first functional unit to said register.

6. In a data processing system comprising a plurality of functional units normally interconnected by a bidirectional bus, and including a first functional unit, apparatus for implementing the tests of the functional units during their normal operation comprising:

(a) each of said plurality of functional units comprising first means for establishing a first coupling in a first direction from its functional unit to said bidirectional bus and second means for establishing a second coupling in a second direction from said bidirectional bus to its functional unit; and (b) control means including means for providing a first disconnect command to said first coupling means whereby each of said first coupling means of said plurality of functional units is disconnected in the first direction from said bidirectional bus, means for then providing a connect command to said first coupling means of said first functional unit whereby said first functional unit is coupled by its first coupling means in said first direction to said bidirectional bus and is tested by said testing means to provide test results and the test results are applied via said first coupling means of said first functional unit to said bidirectional bus, and means for providing connect commands in turn to said first coupling means of each of said other functional units in a predetermined order whereby said first coupling means from said other functional units to said bidirectional bus is established and said other functional units are tested one at a time by said testing means to provide test results and the test results applied one at a time via said second coupling means of its functional unit to said bidirectional bus.

7. Apparatus according to claim 6, wherein said control means comprises a register and a maintenance panel; said first coupling means of each of said other functional units comprises a first series of AND gates, each having first and second inputs and an output coupled to said bidirectional bus; said control means further comprising a second series of AND gates, each having first and second inputs and an output connected to said first inputs of said AND gates of said first series, and means for storing bits into the various locations of said register, each of said various locations corresponding to one of said plurality of functional units, said second input of each of said first series of AND gates being connected respectively with a corresponding functional unit, said first and second input of each of said second series of said AND gates being respectively connected to said maintenance panel and to a corresponding location of said register.

8. An apparatus according to claim 7, wherein there is further included an auxiliary data-processing unit connected to said register by means of a maintenance channel and by said bidirectional bus to each of said plurality of functional units.

9. An apparatus according to claim 8, wherein said means for testing the functional units comprises a control store within said first functional unit.

10. An apparatus according to claim 7, wherein said means for storing into said register is located in said first functional unit.

11. An apparatus according to claim 7, wherein said means for storing is located in said maintenance unit.

* * * * *

UNITED STATES PATENT AND TRADEMARK OFFICE
CERTIFICATE OF CORRECTION

PATENT NO. : 4,145,734
DATED : March 20, 1979
INVENTOR(S) : Jacques M. J. Bienvenu It is certified that error appears in the above-identified patent and that said Letters Patent are hereby corrected as shown below:

Section [57], line 9, after "tested," insert -- if an error is present, it is disconnected from the bus, and--.

Signed and Sealed this

Fourth Day of December 1979

[SEAL]

Attest:

SIDNEY A. DIAMOND

Attesting Officer

Commissioner of Patents and Trademarks